US009569488B2

(12) United States Patent
Boyer et al.

(10) Patent No.: US 9,569,488 B2
(45) Date of Patent: *Feb. 14, 2017

(54) GENERATING QUESTION AND ANSWER PAIRS TO ASSESS UNDERSTANDING OF KEY CONCEPTS IN SOCIAL LEARNING PLAYLIST

(71) Applicant: International Business Machines Corporation, Armonk, NY (US)

(72) Inventors: John M. Boyer, Victoria (CA); Ethan L. Perry, Lexington, MA (US); Marion R. Summerville, Philadelphia, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/684,388

(22) Filed: Apr. 12, 2015

(65) Prior Publication Data

US 2016/0098937 A1   Apr. 7, 2016

Related U.S. Application Data

(63) Continuation of application No. 14/507,291, filed on Oct. 6, 2014.

(51) Int. Cl.
*G06F 17/00* (2006.01)
*G06F 17/30* (2006.01)
(Continued)

(52) U.S. Cl.
CPC ..... *G06F 17/3043* (2013.01); *G06F 17/30528* (2013.01); *G06F 17/30598* (2013.01);
(Continued)

(58) Field of Classification Search
CPC ....................................................... G06N 5/04
See application file for complete search history.

(56) References Cited

U.S. PATENT DOCUMENTS

2002/0188583 A1   12/2002   Rukavina et al.
2004/0076941 A1   4/2004   Cunningham et al.
(Continued)

FOREIGN PATENT DOCUMENTS

WO   02097654 A1   12/2002
WO   03012762 A2   2/2003

OTHER PUBLICATIONS

List of IBM Patents or Patent Applications Treated as Related, Apr. 12, 2015, pp. 1-2.
(Continued)

*Primary Examiner* — Stanley K Hill
*Assistant Examiner* — Ola Olude Afolabi
(74) *Attorney, Agent, or Firm* — Robert A. Voigt, Jr.; Winstead, P.C.

(57) ABSTRACT

A method, system and computer program product for determining whether the social learning playlist is effective in educating participants. The text of the collection of online materials of a social learning playlist is scanned to identify key concepts (i.e., the most important points) using natural language processing. The user selects a concept from a list of key concepts, which includes these identified key concepts, and a type of question (e.g., true/false) to be used in assessing the understanding of the selected key concept. The selected type of question and answer to the question are generated using analytic analysis and artificial intelligence on the online materials of the playlist. In this manner, by generating appropriate question and answer pairs, where the questions are inserted at selected locations within the playlist, the creator of the playlist is able to assess whether the participants are understanding the key concepts in the playlist.

7 Claims, 4 Drawing Sheets

(51) Int. Cl.
*G09B 7/00* (2006.01)
*G06Q 50/00* (2012.01)
*G09B 7/02* (2006.01)

(52) U.S. Cl.
CPC ....... *G06F 17/30867* (2013.01); *G06Q 50/01* (2013.01); *G09B 7/00* (2013.01); *G09B 7/02* (2013.01)

(56) References Cited

U.S. PATENT DOCUMENTS

| | | | |
|---|---|---|---|
| 2012/0315616 A1* | 12/2012 | Fourman | G09B 7/02 434/350 |
| 2013/0117335 A1 | 5/2013 | Jellison, Jr. et al. | |
| 2014/0024005 A1* | 1/2014 | Rosenthal | G09B 5/00 434/308 |
| 2014/0024009 A1 | 1/2014 | Nealon et al. | |

OTHER PUBLICATIONS

"MentorMob Lifestyle Learning," http://www.mentormob.com, 2014, pp. 1-2.

Darrell Etherington, "Gibbon Launches a Different Kind of Education Startup, With User-Generated Learning Playlists for All," techcrunch.com, Dec. 10, 2013, pp. 1-5.

Office Action for U.S. Appl. No. 14/507,291 dated Mar. 11, 2016, pp. 1-25.

* cited by examiner

GENERATING QUESTION AND ANSWER PAIRS TO ASSESS UNDERSTANDING OF KEY CONCEPTS IN SOCIAL LEARNING PLAYLIST

TECHNICAL FIELD

The present invention relates generally to social network services, and more particularly to generating question and answer pairs to assess understanding of key concepts in a social learning playlist.

BACKGROUND

A social network service is an online service, platform or site that focuses on building and reflecting of social networks or social relations among people (e.g., those who share interests and/or activities). A social network service essentially consists of a representation of each user (often a profile), his/her social links, and a variety of additional services. Most social network services are web based and provide means for users to interact over the Internet, such as by e-mail and instant messaging. Social networking sites allow users to share ideas, activities, events, and interests within their individual networks.

Such social networking sites allow users to create what is referred to as "social learning playlists" which contain material collected online for the purpose of online learning. While these social learning playlists can provide a lot of useful information to learners, there is not currently a means for determining whether the participants (those that study the material in the social learning playlists) have actually learned any of the material in the playlist, such as the key concepts (i.e., the most important points) in the playlist. That is, there is not currently a means for assessing the understanding of the key concepts in the material of the playlist. As a result, the creator of the social learning playlist is unsure whether the playlist is effective in educating the participants.

BRIEF SUMMARY

In one embodiment of the present invention, a method for determining whether a social learning playlist is effective in educating participants comprises receiving a social learning playlist containing a collection of online materials. The method further comprises scanning, by a processor, the collection of online materials of the social learning playlist to identify key concepts from text of the collection of online materials using natural language processing. The method additionally comprises forming a list of key concepts comprising the identified key concepts. Furthermore, the method comprises receiving a selection of a key concept from the list of key concepts and a type of question to be used in assessing understanding of the selected key concept. Additionally, the method comprises generating the selected type of question and answer to the selected type of question to assess understanding of the selected key concept using analytic analysis and artificial intelligence on the collection of online materials of the social learning playlist.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
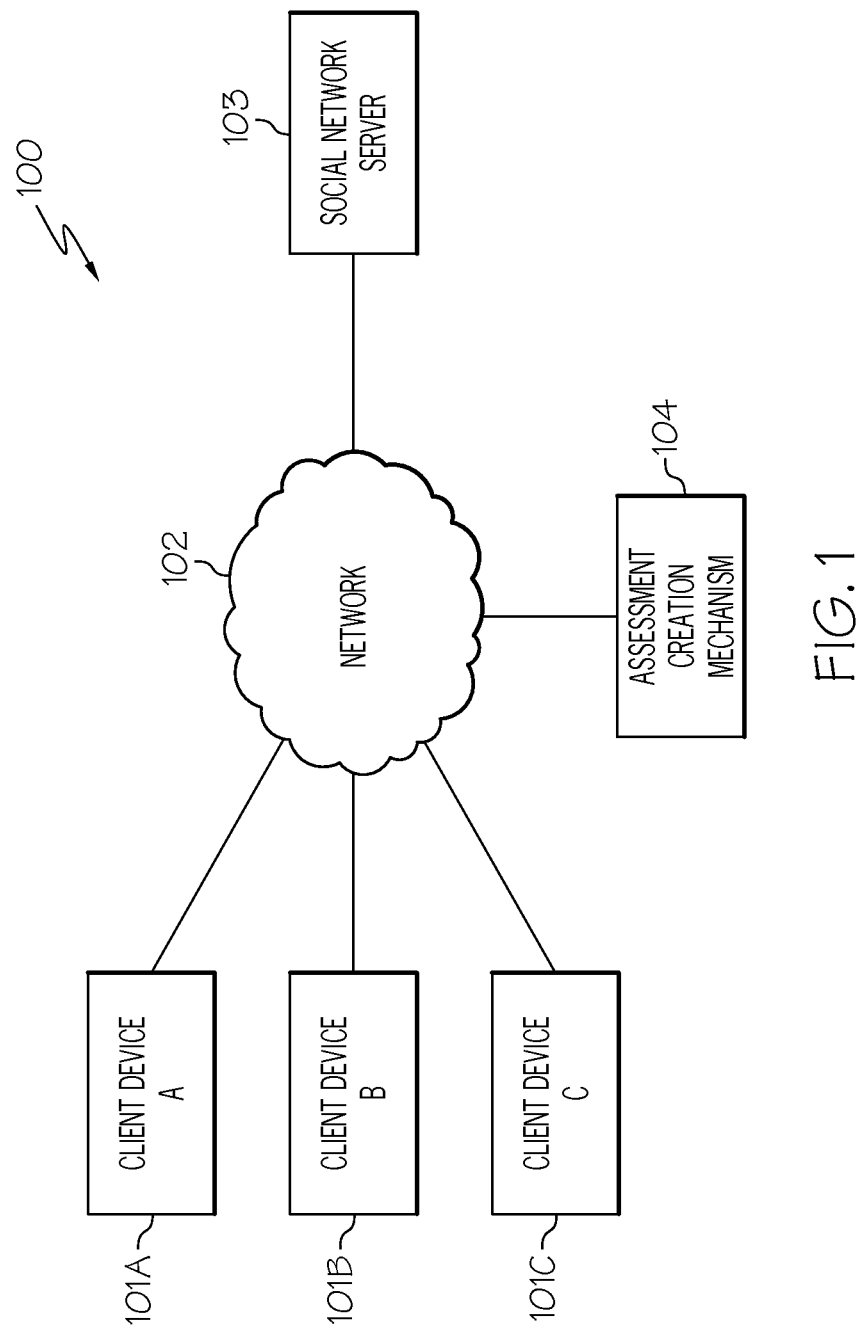
FIG. 1 illustrates a social network system configured in accordance with an embodiment of the present invention.

The present invention comprises a method, system and computer program product for determining whether the social learning playlist is effective in educating participants. In one embodiment of the present invention, a social learning playlist containing a collection of online materials is received to be analyzed to identify the key concepts (i.e., the most important points) in the social learning playlist. The text of the collection of online materials of the social learning playlist is scanned to identify key concepts using natural language processing. For example, action words (e.g., avoid, improve, practice), proper nouns (e.g., Prime Minister David Cameron), words used multiple times (e.g., the term "interview" in an article about interview tips), headings (e.g., words/phrases with a larger font size, words/phrases that are underlined), topic sentences, introduction, conclusion, etc. in the online materials may be used to identify key concepts. Search queries used to locate the social learning playlist and the content items within the social learning playlist may be analyzed to identify further key concepts using natural language processing. Furthermore, social commentary of the social learning playlist may be analyzed to identify additional key concepts using natural language processing. A list of key concepts may then be formed including the identified key concepts. The user selects a concept from the list of key concepts and a type of question (e.g., true/false, multiple choice) to be used in assessing the understanding of the selected key concept. The selected type of question (e.g., true/false) and answer to the question are generated to assess the understanding of the selected concept using analytic analysis and artificial intelligence on the collection of online materials of the social learning playlist. For example, the question of "Which of the following are skills needed for careers of the future?" may be generated based on the key concept of job skills needed for careers of the future. The answer may be generated based on the skills listed in the paragraph with the topic sentence of "The critical skills you need to succeed in the job market of 2020." In this manner, by generating appropriate question and answer pairs, where the questions are inserted at selected locations within the social learning playlist, the creator of the social learning playlist is able to assess whether the participants are understanding the key concepts in the playlist.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a social network system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 103 is connected to network 102 by wire or wirelessly. While FIG. 1 illustrates a single social network server 103, it is noted for clarity that multiple servers may be used to implement the social networking and/or microblogging service.

Social network sites operated by social network server 103 enable each user of client device 101 to create a "social learning playlist" containing material collected online for the purpose of online learning. An assessment of whether the participants (those that study the material in the social learning playlists) understand the key concepts (i.e., the most important points) in the playlist is ascertained by creating appropriate question and answer pairs by a mechanism referred to herein as the "assessment creation mechanism" 104 as discussed in further detail below in connection with FIGS. 3A-3B. As illustrated in FIG. 1, assessment creation mechanism 104 is connected to network 102 by wire or wirelessly. A description of the hardware configuration of assessment creation mechanism 104 is provided below in connection with FIG. 2.

Figure 2:
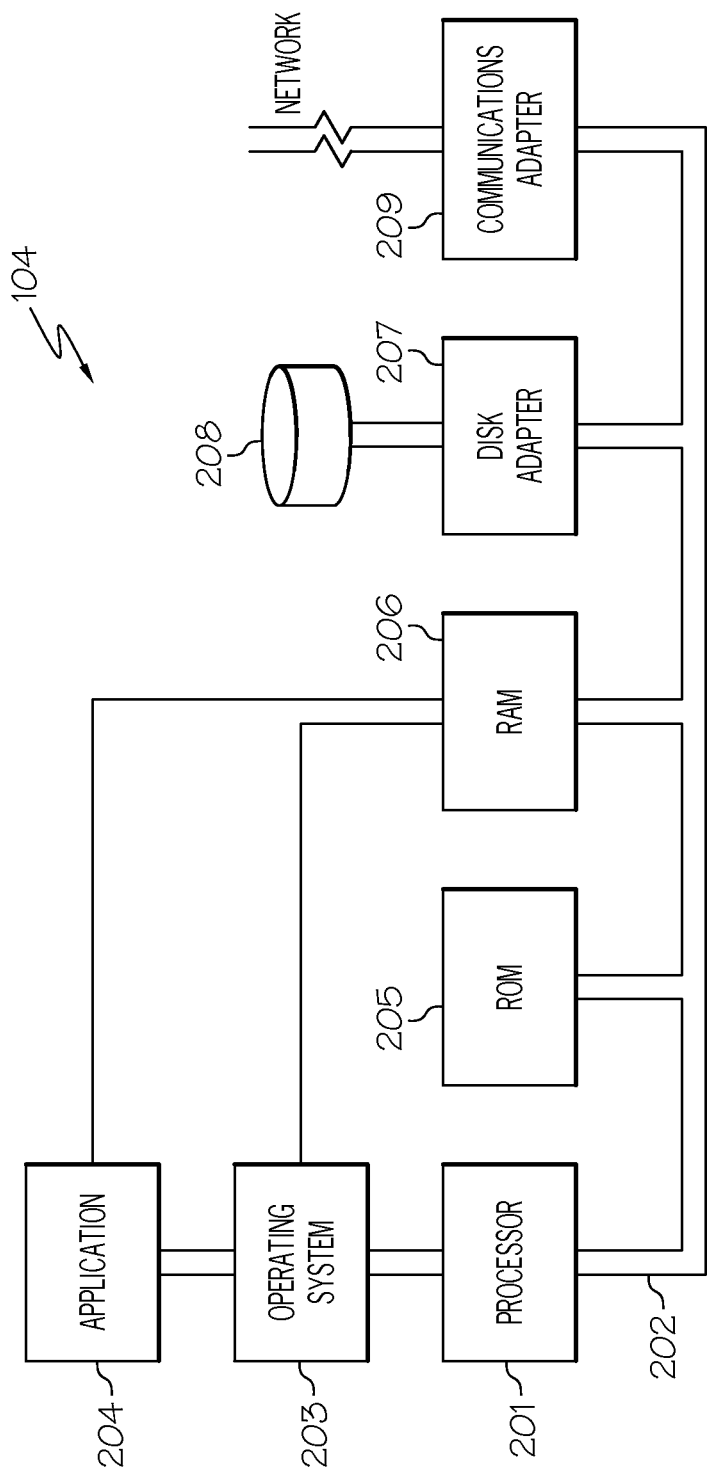
FIG. 2 illustrates a hardware configuration of an assessment creation mechanism configured in accordance with an embodiment of the present invention.

Referring now to FIG. 2, FIG. 2 illustrates a hardware configuration of assessment creation mechanism 104 (FIG. 1) which is representative of a hardware environment for practicing the present invention. Referring to FIG. 2, assessment creation mechanism 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for assessing participants' understanding of the key concepts (i.e., the most important points) in the social learning playlist as discussed further below in association with FIGS. 3A-3B.

Referring again to FIG. 2, read-only memory ("ROM") 205 is coupled to system bus 202 and includes a basic input/output system ("BIOS") that controls certain basic functions of assessment creation mechanism 104. Random access memory ("RAM") 206 and disk adapter 207 are also coupled to system bus 202. It should be noted that software components including operating system 203 and application 204 may be loaded into RAM 206, which may be assessment creation mechanism's 104 main memory for execution. Disk adapter 207 may be an integrated drive electronics ("IDE") adapter that communicates with a disk unit 208, e.g., disk drive. It is noted that the program for assessing participants' understanding of the key concepts (i.e., the most important points) in the social learning playlist, as discussed further below in association with FIGS. 3A-3B, may reside in disk unit 208 or in application 204.

Assessment creation mechanism 104 may further include a communications adapter 209 coupled to bus 202. Communications adapter 209 interconnects bus 202 with an outside network (e.g., network 102 of FIG. 1) thereby allowing assessment creation mechanism 104 to communicate with client devices 101 and social network server 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, social networking sites allow users to create what is referred to as "social learning playlists" which contain material collected online for the purpose of online learning. While these social learning playlists can provide a lot of useful information to learners, there is not currently a means for determining whether the participants (those that study the material in the social learning playlists) have actually learned any of the material in the playlist, such as the key concepts (i.e., the most important points) in the playlist. That is, there is not currently a means for assessing the understanding of the key concepts in the material of the playlist. As a result, the creator of the social learning playlist is unsure whether the playlist is effective in educating the participants.

The principles of the present invention provide a means for enabling the creator of the social learning playlist to assess whether the participants are understanding the key concepts in the playlist by generating appropriate question and answer pairs, where the questions are inserted at selected locations within the social learning playlist as discussed below in association with FIGS. 3A-3B.

Figure 3A:
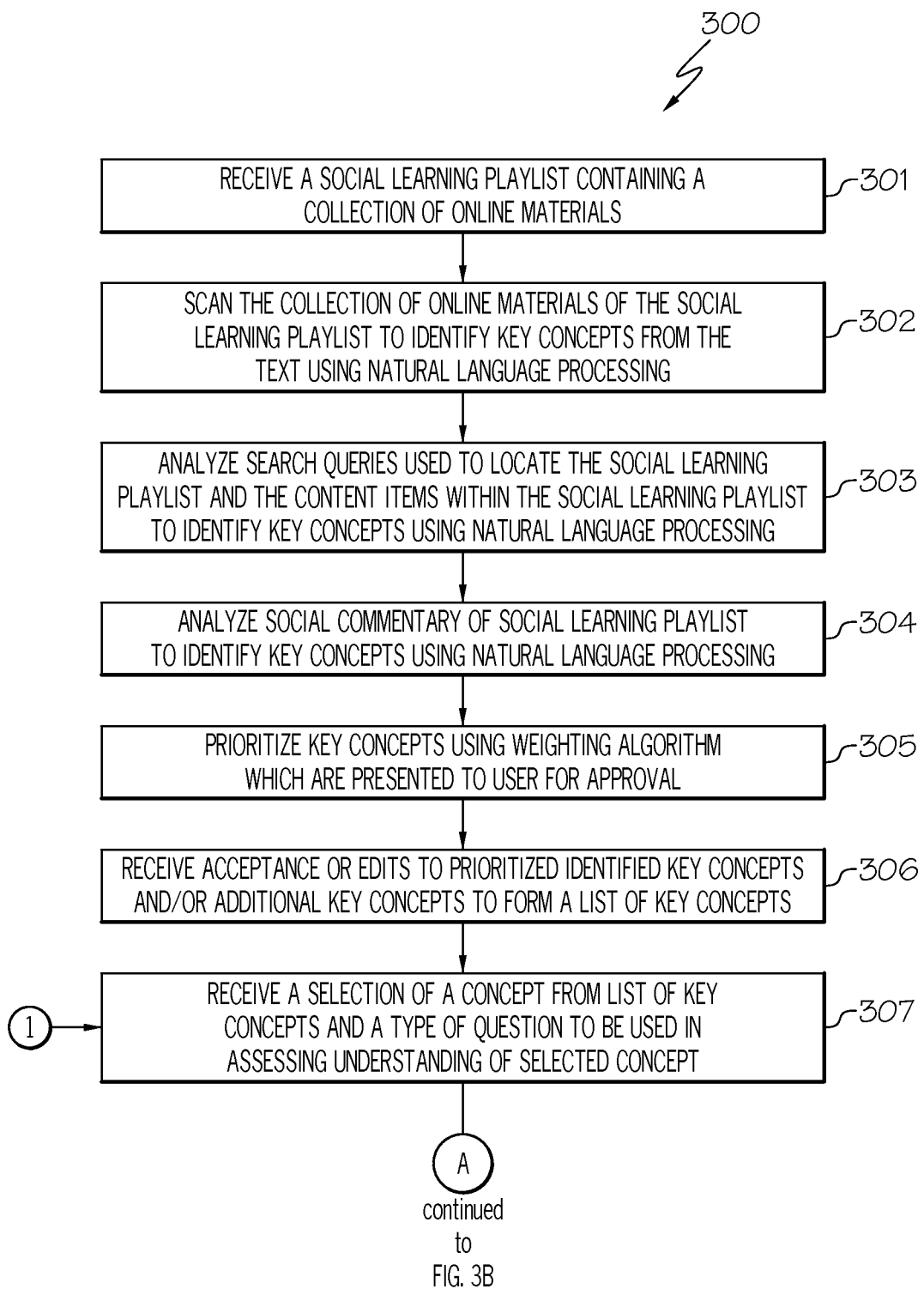
FIGS. 3A-3B are a flowchart of a method for assessing participants' understanding of the key concepts in the social learning playlist in accordance with an embodiment of the present invention.
Figure 3B:
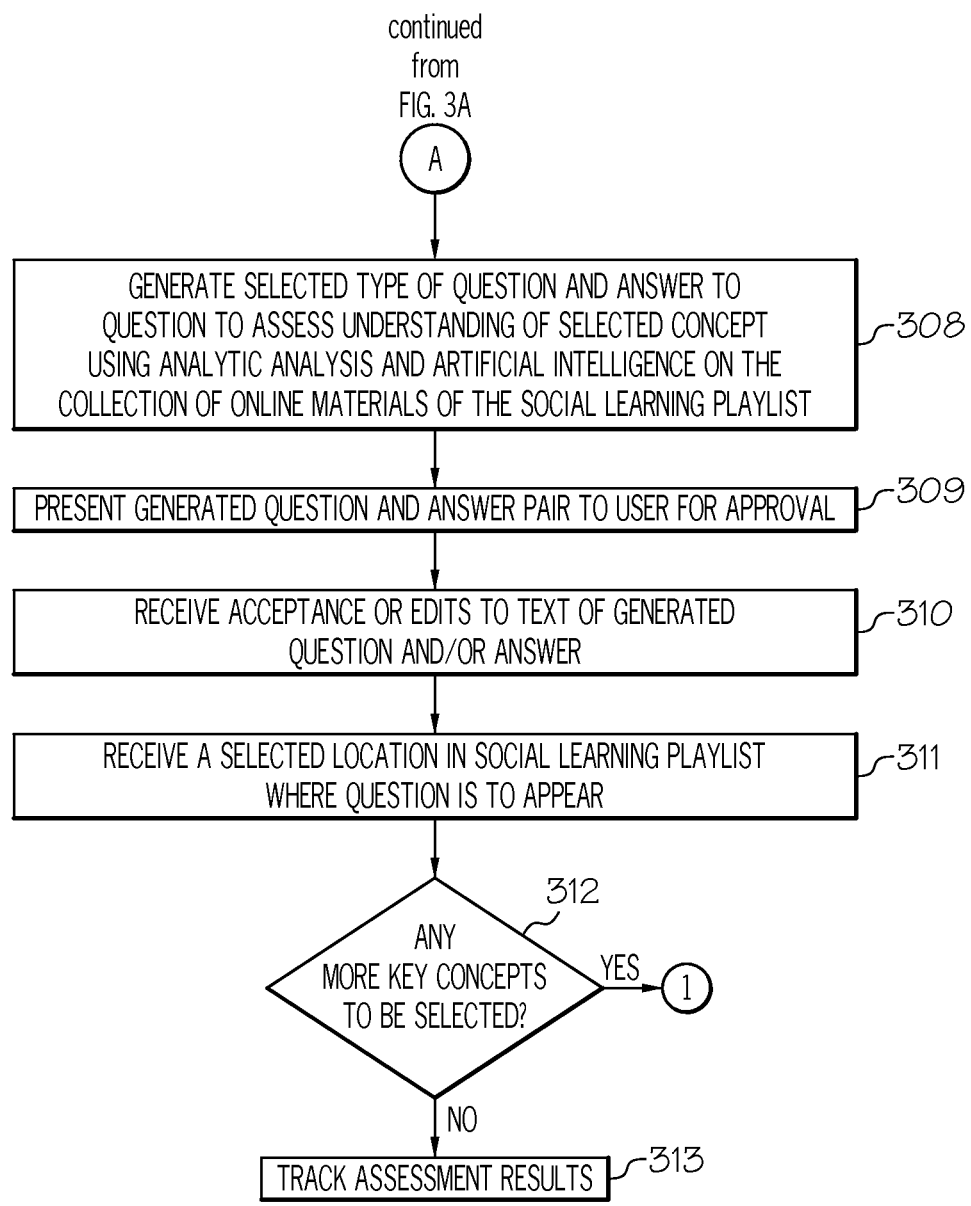

FIGS. 3A-3B are a flowchart of a method 300 for assessing participants' understanding of the key concepts in the social learning playlist in accordance with an embodiment of the present invention.

Referring to FIG. 3A, in conjunction with FIGS. 1-2, in step 301, assessment creation mechanism 104 receives a social learning playlist containing a collection of online materials to have assessment questions added to the playlist. As discussed above, social networking sites allow users (e.g., user of client device 101) to create what is referred to as "social learning playlists" which contain material collected online for the purpose of online learning. The assessment creation mechanism 104 may receive the social learning playlist created by the user of client device 101 in many ways, such as by having the user upload the social learning playlist to assessment creation mechanism 104.

In step 302, assessment creation mechanism 104 scans the collection of online materials of the social learning playlist to identify key concepts (i.e., the most important points) from the text of the collection of online materials using natural language processing. For example, assessment creation mechanism 104 may focus on action words (e.g., avoid, improve, practice), proper nouns (e.g., Prime Minister David Cameron), words used multiple times (e.g., the term "interview" in an article about interview tips), headings (e.g., words/phrases with a larger font size, words/phrases that are underlined), topic sentences, introduction, conclusion, etc. in the online materials to identify key concepts. For instance, in an online material (e.g., article) of a social learning playlist entitled "Top Ten Interview Techniques," a heading of "Dress for Interview Success" may be identified as corresponding to a key concept of dressing well for the interview.

In step 303, assessment creation mechanism 104 analyzes the search queries used to locate the social learning playlist and the content items within the social learning playlist to identify key concepts using natural language processing. For example, the search query of "top careers in the future" may be used to locate the social learning playlist directed to job skills needed for the future with content items directed to "list of jobs skills in demand" and a "list of skill trades that are the hardest to fill." Using natural language processing, assessment creation mechanism 104 can identify the key concept of job skills needed for careers of the future based on analyzing the search query of "top careers in the future" and the content items of "list of jobs skills in demand" and a "list of skill trades that are the hardest to fill."

In step 304, assessment creation mechanism 104 analyzes the social commentary of the social learning playlist to identify key concepts using natural language processing. For example, there may be a social discussion regarding the social learning playlist that is focused on one of the main key concepts or important points in the social learning playlist. For instance, the key concept of college graduates having a difficult time finding jobs in their field may be identified based on identifying the topic sentences of "Sixty percent of U.S. college graduates cannot find a full-time job in their chosen profession, according to job placement firm Adecco" and "College graduates ages 24 and younger face an uncertain job future that, even with improving employment numbers, is only going to get more difficult if we continue to turn out graduates without what an Apple exec described as "the skills we need"" in the social commentary of the social learning playlist.

In step 305, assessment creation mechanism 104 prioritizes the key concepts (key concepts in steps 302-304) using a weighting algorithm which are presented to the user (e.g., user of client device 101A) for approval. For example, the concept of job skills needed for careers of the future may be ranked higher than the concept of dressing well for the interview in the social learning playlist entitled "The Critical Skills You Need To Succeed In The Job Market Of 2020" since there are more terms in the concept of job skills needed for careers of the future that match/correspond to the terms and meaning in the title of the social learning playlist. After prioritizing the key concepts, the key concepts are presented to the user in order of priority.

In step 306, assessment creation mechanism 104 receives acceptance of the prioritized key concepts or edits to the prioritized identified key concepts and/or additional key concepts from the user (e.g., user of client device 101A) to form a list of key concepts. For example, the user may highlight a passage in the social learning playlist to correspond to a key concept to be added to the prioritized key concepts to form a list of key concepts.

In step 307, assessment creation mechanism 104 receives a selection of a concept from the list of key concepts and a type of question (e.g., multiple choice, true/false, numerical) to be used in assessing the understanding of the selected concept from the user (e.g., user of client device 101A). For example, the user may select the key concept of job skills needed for careers of the future and a multiple choice question, where the correct answer includes a listing of the skills listed in the social learning playlist.

Referring now to FIG. 3B, in conjunction with FIGS. 1-2, in step 308, assessment creation mechanism 104 generates the selected type of question and answer to the question to assess the understanding of the selected concept using analytic analysis and artificial intelligence on the collection of online materials of the social learning playlist. For example, the question of "Which of the following are skills needed for careers of the future?" may be generated based on the key concept of job skills needed for careers of the future. If the user selected the question to be multiple choice, then multiple answers would be generated listing one or more skills discussed in the playlist as well as those not discussed in the playlist (the incorrect answers). The correct answer would be derived from the skills that were discussed in connection with the concept of job skills needed for careers of the future. For example, in a paragraph with the topic sentence of "The critical skills you need to succeed in the job market of 2020," all of the skills (e.g., "core business competencies," "think holistically," "work without direct leadership" and "data analysts") listed in the paragraph would be used to generate the correct answer to the question.

In step 309, assessment creation mechanism 104 presents the generated question and answer pair to the user (e.g., user of client device 101A) for approval.

In step 310, assessment creation mechanism 104 receives acceptance of the generated question and answer or edits to the text of the generated question and/or answer.

In step 311, assessment creation mechanism 104 receives a selected location in the social learning playlist where the generated question is to appear. For example, the user may select the question "Which of the following are skills needed for careers of the future?" following the paragraph discussing the skills need to succeed in the job market of 2020. In this manner, by generating appropriate question and answer pairs, where the questions are inserted at selected locations within the social learning playlist, the creator of the social learning playlist is able to assess whether the participants are understanding the key concepts in the playlist.

In step 312, a determination is made by assessment creation mechanism 104 as to whether there are more key concepts to be selected by the user.

If there are more key concepts to be selected by the user, then assessment creation mechanism 104 receives a further selection of a concept from the list of key concepts and a type of question to be used in assessing the understanding of the selected concept from the user (e.g., user of client device 101A) in step 307 of FIG. 3A.

If, however, there are no more key concepts to be selected by the user, then, in step 313, assessment creation mechanism 104 tracks the assessment results. That is, assessment creation mechanism 104 tracks the success of participants in successfully answering the generated questions which are inserted in the social learning playlist to assess the participants' understanding of the key concepts of the social learning playlist. To be clear, assessment creation mechanism 104 tracks the success of participants in successfully answering the generated questions after all the questions generated in step 308 for each selected key concept have been inserted at selected locations in the social learning playlist. In this manner, the creator of the social learning playlist is able to assess whether the participants are understanding the key concepts in the playlist.

If it is determined that the participants are not understanding the key concepts in the playlist, then the creator of the social learning playlist may modify the social learning playlist to improve understanding of the key concepts, such as by changing the language in one or more of the materials that comprise the social learning playlist.

In addition, the assessments generated by the present invention in conjunction with the associated social learning playlist can be integrated with a formal learning system, such as a formal Learning Content Management System (LCMS) or a Learning Management System (LMS).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for determining whether a social learning playlist is effective in educating participants, the method comprising:
   receiving a social learning playlist to educate participants containing a collection of online materials;
   scanning, by a processor, said collection of online materials of said social learning playlist to identify key concepts from text of said collection of online materials using natural language processing;
   forming a list of key concepts comprising said identified key concepts;
   receiving a selection of a key concept from said list of key concepts and a type of question to be used in assessing understanding of said selected key concept; and
   generating said selected type of question and answer to said selected type of question to assess understanding of said selected key concept using analytic analysis and artificial intelligence on said collection of online materials of said social learning playlist.

2. The method as recited in claim 1 further comprising:
   analyzing search queries used to locate said social learning playlist and content items within said social learning playlist to identify additional key concepts using said natural language processing; and
   analyzing social commentary of said social learning playlist to identify additional key concepts using said natural language processing.

3. The method as recited in claim 2 further comprising:
   prioritizing said identified key concepts using a weighting algorithm which are presented to a user for approval.

4. The method as recited in claim 3 further comprising:
   receiving acceptance of said prioritized identified key concepts or one or more of edits to said prioritized identified key concepts and additional key concepts to form said list of key concepts.

5. The method as recited in claim 1 further comprising:
   presenting said generated question and answer to a user for approval; and
   receiving acceptance of said generated question and answer or edits to text of one or more of said generated question and answer.

6. The method as recited in claim 1 further comprising:
   receiving a selected location in said social learning playlist where said generated question is to appear.

7. The method as recited in claim 1 further comprising:
   tracking success of participants in successfully answering said generated question to assess said participants' understanding of said selected key concept.

* * * * *